United States Patent
Hazenbroek

[11] Patent Number: 5,154,665
[45] Date of Patent: Oct. 13, 1992

[54] ON-LINE POULTRY THIGH REMOVER

[76] Inventor: Jacobus E. Hazenbroek, Burg de Zeeuwstraat 52, Numansdorp, Netherlands

[21] Appl. No.: 824,011

[22] Filed: Jan. 22, 1992

[51] Int. Cl.⁵ .......................................... A22C 21/00
[52] U.S. Cl. ................................. 452/155; 452/151; 452/160; 452/167
[58] Field of Search ............... 452/155, 149, 151, 152, 452/160, 167

[56] References Cited

U.S. PATENT DOCUMENTS

| | | | |
|---|---|---|---|
| 3,950,820 | 4/1976 | Duncan et al. | 17/11 |
| 4,468,838 | 9/1984 | Sjöström et al. | 452/160 |
| 4,558,489 | 12/1985 | Van Mil | 452/160 |
| 4,574,429 | 3/1986 | Hazenbroek | 17/52 |
| 4,593,435 | 6/1986 | Martin et al. | 17/52 |
| 4,815,168 | 3/1989 | Van Den Nieuwelaar et al. | 452/149 |
| 4,896,399 | 1/1990 | Hazenbroek | 452/167 |
| 5,015,213 | 5/1991 | Hazenbroek | 452/149 |
| 5,019,013 | 5/1991 | Hazenbroek | 452/151 |
| 5,035,673 | 6/1991 | Hazenbroek | 452/149 |
| 5,092,815 | 3/1992 | Polkinghorne | 452/167 |

*Primary Examiner*—Willis Little
*Attorney, Agent, or Firm*—Hopkins & Thomas

[57] ABSTRACT

The present invention comprises a method and apparatus for automatically separating the legs and thighs of birds from the backs of birds while the birds are moving along a poultry processing line. The thigh joints between the thighs and lower backs of the birds are engaged between the angular contact edges (43 and 44) of a pair of yieldable cam shoes (37 and 38) and the side surfaces (33 and 34) of a vertical center guide partition (31). As a result, the thigh joints are aligned with the cutting blades (54 and 56) of a cutting means (36), positioned downstream of the yieldable cam shoes (37 and 38), which cuts through the thigh joints to separate the legs and thighs from the back portions of the birds.

25 Claims, 5 Drawing Sheets

ON-LINE POULTRY THIGH REMOVER

FIELD OF THE INVENTION

The present invention relates in general to the cutting apart of previously eviscerated poultry carcasses, such as chickens and turkeys, as the carcasses are moved in series, suspended by their legs, along a poultry processing line. More particularly, the present invention relates to a method and apparatus for aligning the thigh joints between the thighs and lower backs of birds with a cutting means positioned along the poultry processing line and separating the thighs from the backs of the birds with the cutting means as the birds are moved in series suspended by their legs from the overhead conveyor system.

BACKGROUND OF THE INVENTION

In the processing of whole chickens and other poultry through a poultry processing plant for the cleaning and cut-up of the birds into parts and for packaging and delivery of the parts to retail food stores and restaurants, etc., it is highly desirable to perform as many of the processing steps such as defeathering, evisceration, cut-up, and packaging, as is practical with automated machinery in order to minimize the expense and manual handling of the birds and to uniformly cut apart the birds.

A practice has developed wherein the birds are carried in spaced series along a poultry processing line with each bird suspended by its legs from an overhead conveying system, and as many of the automated processing steps as practical are performed on the birds as they move in series along the processing line. For example, the birds can be defeathered, decapitated, opened, and eviscerated as the birds are suspended by their legs and are advanced in series progressively along a poultry processing line. It is further desired that the birds be cut into sections while traveling on the overhead conveying system along the processing line to further reduce the amount of manual handling of the birds during processing. An on-line cut up system of this general type is disclosed in my prior U.S. Pat. No. 4,574,429. However, because of the difficulties in accurately cutting the birds and because some of the desired cuts are difficult to make with automated equipment, it is still common practice to remove the birds from the overhead conveyor system prior to cutting them apart.

One of the problems with prior art poultry cut up machines of the type that cut the birds while the birds are suspended by their legs from an overhead conveying system is that it is difficult to accurately position and maintain the birds in proper alignment with the cutting elements of the cut-up machine so that proper cuts are made in the birds. When birds of different sizes enter a cut up machine, the larger or smaller birds tend to approach the cutting elements in positions that are too high or too low for the cutting elements. As a result, the cutting elements of the cut up equipment tend to miss the desired cutting zones at the joints of the carcasses of the birds and tend to form improperly cut parts and sometimes cut through the bones of the birds. Engagement and cutting of the bones by the cutting elements creates bone fragments or bone splinters that can become lodged in the meat of the poultry parts, which can pose a serious health risk to the end consumer.

Therefore, it can be seen that it would be desirable to provide an improved, reliable and accurate method for automatically separating the parts of previously eviscerated poultry carcasses as the carcasses are moved in series along an overhead conveyor system with the joints between the sections of the poultry carcasses being opened and aligned with the cutting elements of the cut-up equipment to eliminate the risk of engaging and splintering the bones of the joints of the poultry carcasses with the cutting element and to avoid further manual handling of the birds during the separation process.

SUMMARY OF THE INVENTION

Briefly described, the present invention comprises an improved method and apparatus for separating the thighs from the backs of previously eviscerated birds as the birds are moved in suspended series along an overhead conveyor line. The on-line poultry thigh remover is mounted along with other poultry processing equipment on a poultry processing line, along the path of movement of the birds so as to receive and cut apart the birds moving in series along the processing line. Preferably, prior to moving into engagement with the on-line poultry thigh remover, the birds will have been carried through previous cutting stations wherein the wings and breasts of the birds were removed. Additionally, the birds are cut longitudinally along their backbones prior to entering the on-line poultry thigh remover to separate the birds into two separate carcass halves, each having a substantially flat inwardly facing cut surface formed by the cutting of the birds longitudinally and each including a leg, thigh, and back portion.

A vertically oriented center guide partition extends longitudinally along a central axis of the on-line poultry thigh remover, parallel to the path of movement of the birds along the overhead conveyor line. The carcass halves pass on opposite sides of the vertical center guide partition and are guided toward cutters positioned along the length of the vertical center guide partition plate.

A pair of horizontally oriented yieldable cam shoes are mounted on opposite sides of the vertical center guide partition. Tension springs are each attached to one end of the yieldable cam shoes, and the springs urge the yieldable cam shoes toward the vertical center guide partition. Each yieldable cam shoe includes first and second angular inwardly facing contact edges, which engage the carcass halves, pressing the flat cut surfaces of the carcass halves into flat frictional abutment against opposite sides of the vertical center guide partition as the carcass halves move along the overhead conveyor line. The carcass halves are pulled by the overhead conveyor system between the angular contact edges of the yieldable cam shoes and the vertical center guide partition as the carcasses are carried forwardly along the overhead conveyor line. As the carcass halves are pulled forwardly, the first angular contact edges of the yieldable cam shoes resist the forward movement of the legs and thighs between the first angular contact edges of the yieldable cam shoes and the vertical center guide partition. As a result, the thighs are urged upwardly, lifted over the first angular contact edges of the yieldable cam shoes by the overhead conveyor system as it carries the carcass halves forwardly.

The second angular contact edges of the yieldable cam shoes locate and engage the thigh joints between the thighs and back portions of the carcass halves as the thighs are lifted, and prevent the larger mass of the back portions from being lifted upwardly with the legs and thighs and passing between the vertical center guide partition and the second angular contact edges of the yieldable cam shoes. The location and engagement of the thigh joints aligns the thigh joints with the cutters downstream and automatically positions the legs and thighs of the birds at the proper elevation for cutting to ensure that the legs and thighs are completely and cleanly separated from the back portions of the birds.

The cutting means includes a pair of rotary disc cutters, mounted on opposite sides of the vertical center guide partition along the path of movement of the birds. The rotary disc cutters each have a substantially horizontally oriented cutting blade mounted to a drive shaft attached to a drive motor which rotates each cutting blade. The cutting blades engage and cut through the thigh joints between the thighs and lower backs of the carcass halves to separate the back portions from the legs and thighs of the carcass halves. Removal discs are mounted below the cutting blades of the rotary disc cutters attached to the drive shafts for the rotary disc cutters and are rotated in unison with the rotation of the cutting blades. The separated back portions fall away from the cutting blades onto the rotating removal discs, which urge the back portions away from the rotary disc cutters toward a removal means for removing the back portions of the carcass halves from the on-line poultry thigh remover as the legs and thighs continue along the overhead conveyor line for further processing.

Therefore, it is an object of this invention to provide an improved method and apparatus for automatically separating the back portions from the legs and thighs of the birds while the birds are being transported in suspended series along a poultry processing line.

Another object of this invention is to provide an improved method and apparatus for isolating and aligning the thigh joints between the thighs and back portions of birds with the cutting elements of a poultry cut-up system to reliably and accurately separate the legs and thighs from the back portions of birds moving along the overhead conveyor line.

Another object of this invention is to provide a method and apparatus for automatically and reliably subdividing birds moving along an overhead conveyor line in series with other poultry cut-up equipment mounted along a poultry processing line.

Another object of this invention is to provide an improved method and apparatus for reducing the manual handling steps required in the process of subdividing and separating the parts of poultry in a poultry processing plant.

Other objects, features, and advantages of the present invention will become apparent upon reading the following detailed description when taken in conjunction with the accompanying drawings.

DETAILED DESCRIPTION OF THE PREFERRED EMBODIMENT

Figure 1:
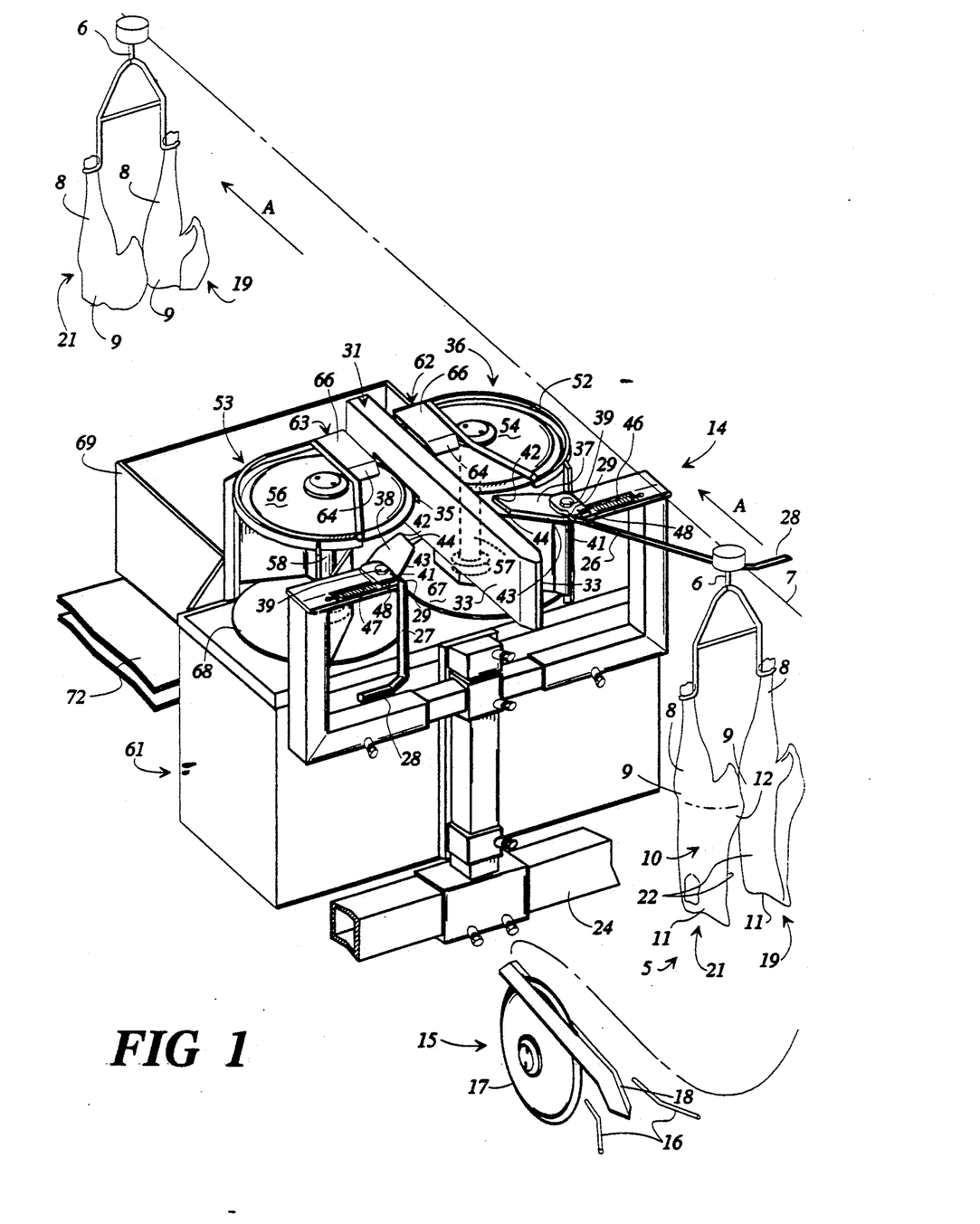
FIG. 1 is a perspective view of the on-line poultry thigh remover mounted along a poultry processing line.

Referring now to the drawings in which like numerals indicate like parts throughout the several views, FIG. 1 illustrates a bird 5 suspended from a shackle 6 of an overhead conveyor line 7. The bird 5 includes legs 8, thighs 9, and a back 10 including an upper back portion 11 and a lower back portion 12. The legs, thighs, and lower back generally comprise the saddle portion of the bird 5. Typically, the wings and the breast portion of the bird will have been removed from the bird 5 prior to engagement of the bird by the on-line poultry thigh remover 14.

Figure 2:
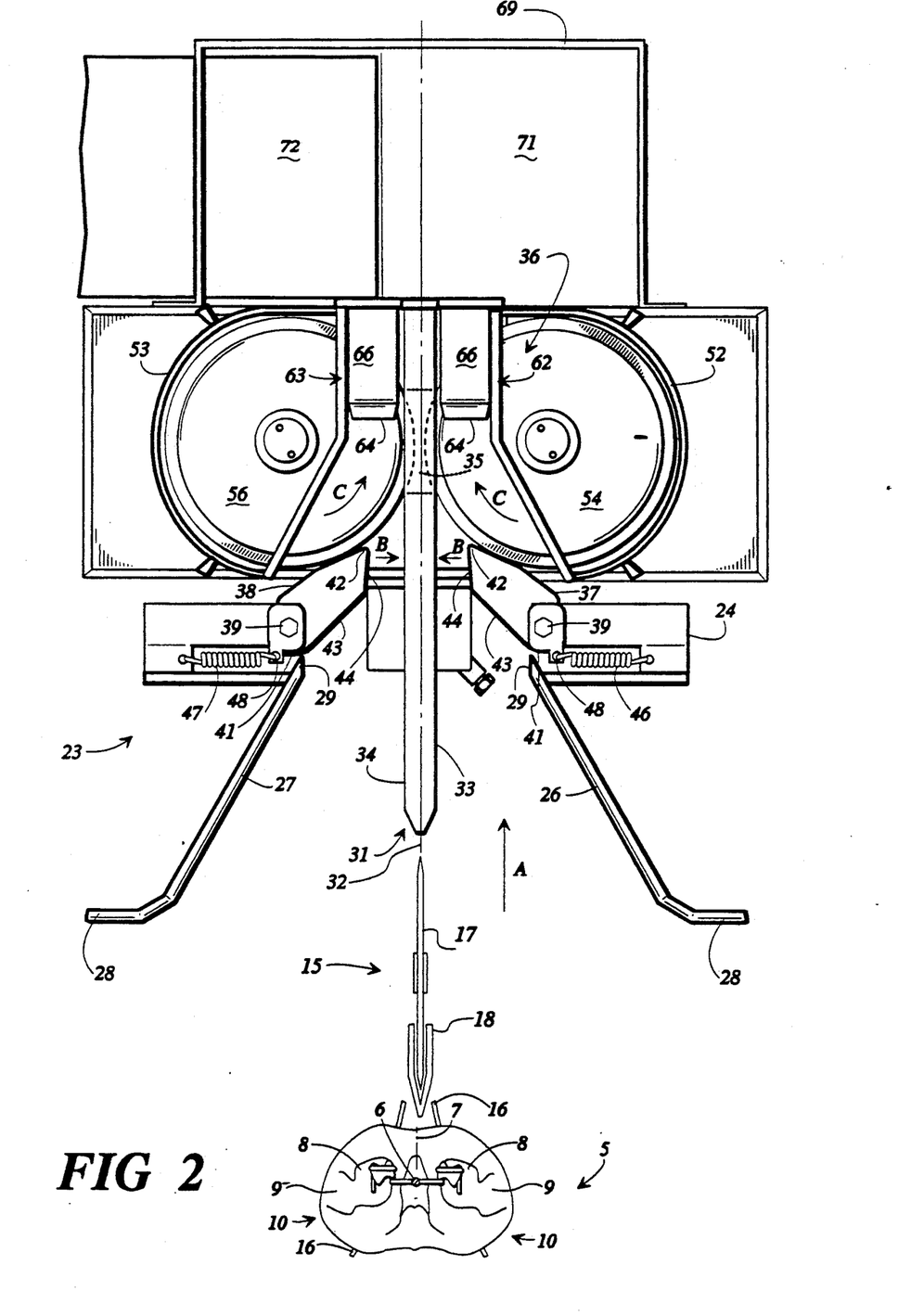
FIG. 2 is a plan view of the on-line poultry thigh remover.

As shown in FIGS. 1 and 2, a halving station 16 is positioned along the overhead conveyor line 7, upstream from the on-line poultry thigh remover 14. The halving station 15, illustrated schematically, includes a pair of upwardly sloping converging guide rods 16 and a large vertically oriented rotary halving blade 17 mounted along the path of movement of the bird 5, in a position to engage and cut completely through the bird along the backbone of the bird moved in the direction of arrow A along the overhead conveyor line 7. An internal guide rail 18 is mounted above the rotary halving blade 17 between the downstream ends of guide rods 16, extending substantially parallel to the path of movement of the bird along the overhead conveyor line 7. As illustrated in FIG. 1, the rotary halving blade 17 extends substantially through the internal guide rod 18. As the bird is carried into the halving station 16 by the overhead conveyor line and engages the pair of guide rods 16 which reorient the bird for engagement by the internal guide rail 18. The bird engages and is pulled along the length of the internal guide rail, and the rotary halving blade cuts through the bird longitudinally along its backbone to thereby separate the bird into carcass halves 19 and 21. As shown in FIG. 1, each carcass half 19 and 21 includes a leg 8, a thigh 9, and one half of a back portion 10, and has a substantially flat inwardly facing cut surface 22.

As illustrated in FIG. 1, the on-line poultry thigh remover 14 includes an adjustable support frame 24 mounted along a poultry processing line aligned with the path of movement of the bird 5 on the overhead conveyor line 7 along a processing path in the direction of arrows A. As indicated, the carcass halves move through the poultry halving apparatus at the same time. Therefore, each side of the poultry halving apparatus is substantially a mirror image of the other so that the carcass halves are processed simultaneously as they move along their processing path.

A pair of parallel guide rods 26 and 27 are mounted to the support frame 24 at the entrance end of the on-line poultry thigh remover. The guide rods 26 and 27 include upstream entrance ends 28 that project outwardly, extending transversely to the path of movement of the carcass halves, and downstream exit ends 29, oriented substantially parallel to each other. The guide rods are angled inwardly along their length from their upstream ends 28 toward their downstream ends 29, converging toward each other. The guide rods are engaged by the carcass halves 19 and 21 as the carcass halves enter the on-line poultry thigh remover and stabilize the carcass halves 19 and 21, preventing the carcass halves from swinging from side to side.

As illustrated in FIGS. 1 and 2, a vertical center guide partition 31 is mounted to the support frame 24, positioned between the downstream ends 29 of the guide rods 26 and 27 and extends longitudinally along a central axis 32 (FIG. 2) of the on-line poultry thigh remover 14. The vertical center guide partition 31 extends rearwardly through the center of the on-line poultry thigh remover and is aligned with the path of movement of the bird 5 (FIG. 1) along the overhead conveyor line 7. The vertical center guide partition 31 is a rectangular plate typically formed from a nylon or plastic material and has a pair of substantially smooth flat oppositely facing side surfaces 33 and 34. The side surfaces act as guide surfaces along which the inwardly facing cut surfaces 22 of the carcass halves are passed for cutting.

Figure 3:
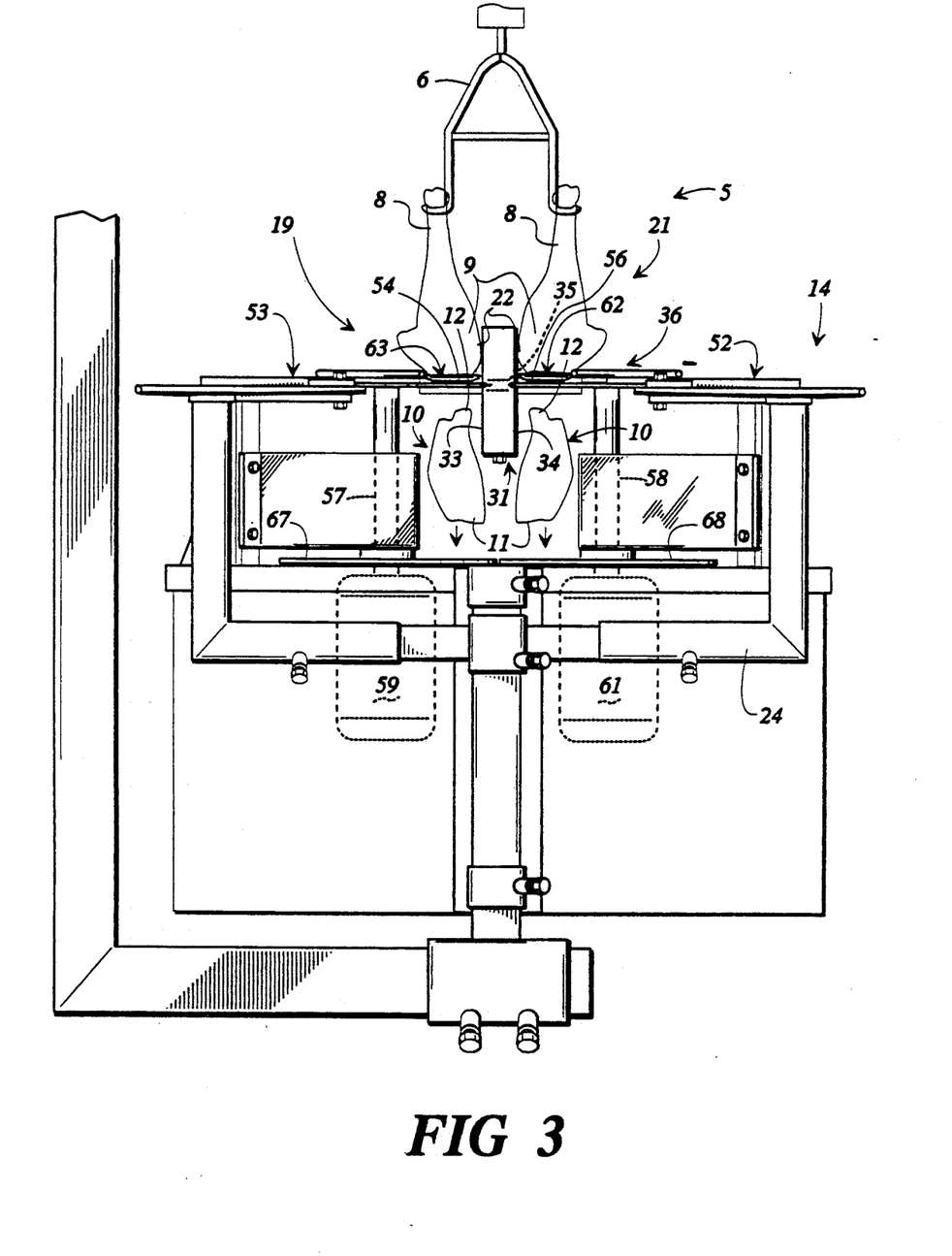
FIG. 3 is an end view of the on-line poultry thigh remover showing the removal of the back portions from the legs and thighs of the carcass halves.

As shown in FIGS. 2 and 3, a rectangular slot 35, shown in dashed lines, is formed along the length of the vertical center guide partition intermediate the upper and lower edges of the vertical center guide partition, formed through the side surfaces 33 and 34 of the vertical center guide partition. The vertical center guide partition 31 (FIG. 3) separates the carcass halves 19 and 21 and guides the carcass halves toward a downstream cutting means 36 for the on-line poultry thigh remover.

As shown in Figs. 1 and 2, a pair of yieldable cam shoes 37 and 38 are movably mounted to the support frame 24 by fasteners 39 and are positioned on opposite sides of the vertical center guide partition 31. The yieldable cam shoes are mounted adjacent the downstream ends 29 (FIG. 2) of the guide rods 26 and 27. Each yieldable cam shoe is generally formed from a nylon material. Each yieldable cam shoe includes a rounded upstream end 41, a pointed downstream end 42, a first angular contact edge 43 adjacent the upstream ends 41, and a second angular inwardly facing contact edge 44 extending adjacent the side surfaces 33 and 34 of the vertical center guide partition 31 and adapted to engage the carcass halves.

Tension springs 46 and 47 are attached at one end to the support frame 26 and are attached at their other ends to a tab 48 formed at the upstream ends 41 of the yieldable cam shoes 36 and 37. The tension springs 46 and 47 urge the tabs 48 outwardly, causing the yieldable cam shoes to rotate about their fasteners 39 to urge the second angular contact edges 44 of the yieldable cam shoes toward engagement with the side surfaces 33 and 34 of the vertical center guide partition 31 in the direction of arrows B (FIG. 2). As a result, as the carcass halves 19 and 21 (FIG. 1) are moved along the overhead conveyor line 7, the carcass halves engage the yieldable cam shoes which urge the carcass halves against the side surfaces of the vertical center guide partition. The first and second angular contact edges 43 and 44 of the yieldable cam shoes tend to locate and align the thigh joints between the thighs 9 and lower backs 12 of the carcass halves at the proper elevation for cutting by the downstream cutting means 36.

As FIGS. 1 and 2 illustrate, the cutting means 36 of the on-line poultry thigh remover 14 is positioned adjacent the vertical center guide partition 31 along the path of movement of the bird 5 (FIGS. 1 and 3) downstream from the yieldable cam shoes. The cutting means comprises a pair of rotary disc cutters 52 and 53 mounted on opposite sides of the vertical center guide partition adjacent the side surfaces 33 and 34 of the vertical center guide partition. The rotary disc cutters 52 and 53 include horizontally oriented circular cutting blades 54 and 56 positioned adjacent the downstream ends 42 of the yieldable cam shoes 36 and 37. As shown in FIG. 2, the cutting blades each extend from opposite sides of the partition into the slot 35 formed through the vertical center guide partition. The cutting blades 54 and 56 are arranged to cut through the thigh joints between the thighs 9 and lower back portions 12 of the carcass halves 19 and 21 to separate the thighs and legs from the back portions of the bird 5.

The cutting blades 54 and 56 (FIG. 3) are mounted on rotary drive shafts 57 and 58 connected to variable speed drive motors 59 and 61. The drive motors rotate the drive shafts to thereby cause the rotation of the cutting blades 54 and 56 in the direction of arrows C (FIG. 2) to cut through and separate the carcass halves.

Figure 4:
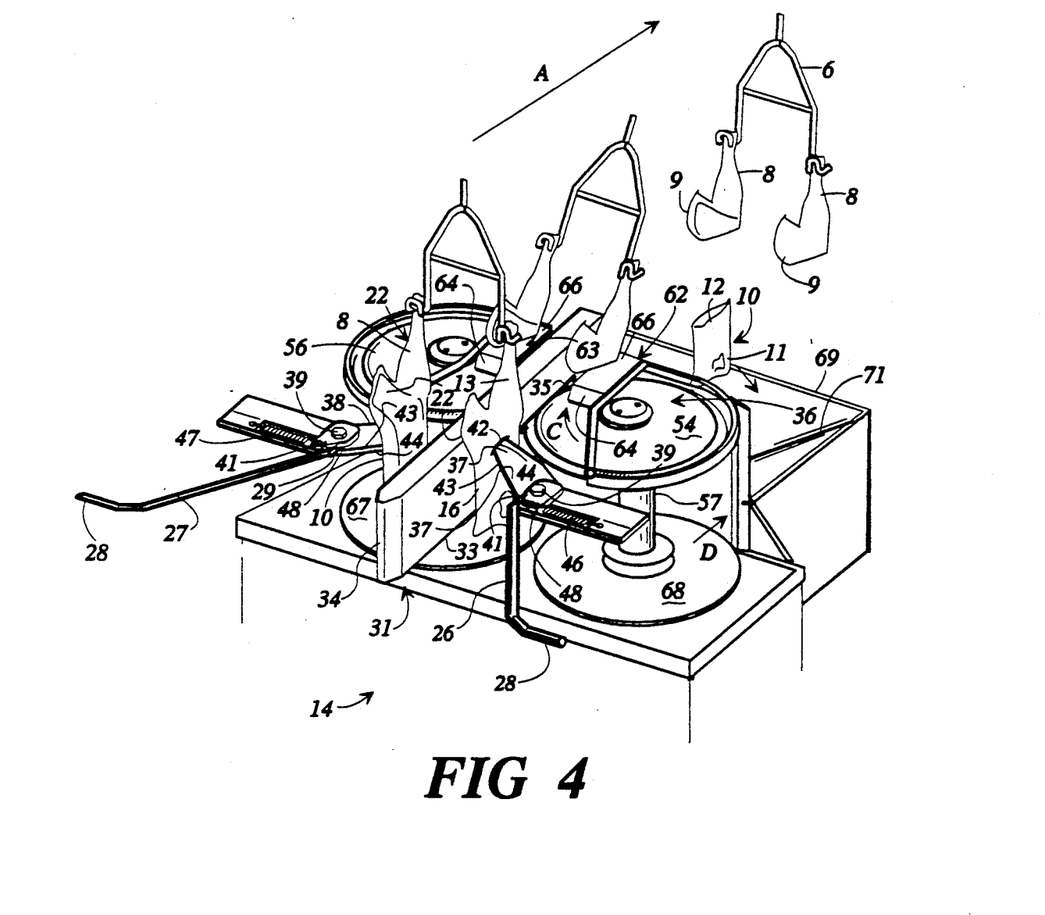
FIG. 4 is a perspective view of one side of the online poultry thigh remover showing the separation and removal of the back portion of a carcass half from the legs and thighs of the carcass half, with parts broken away for clarity.

As shown in FIGS. 1 and 2, guide plates 62 and 63 are mounted above the cutting blades 54 and 56 of the rotary disc cutters 52 and 53, positioned adjacent and extending parallel to the vertical center guide partition 31. The guide plates 62 and 63 are formed from polished stainless steel and each have an upwardly slanting front end 64 and a horizontal rear portion 66 extending parallel to the cutting blades 54 and 56, spaced above the cutting blades, as shown in FIG. 3. As shown in FIG. 4, the guide plates act as guide surfaces over which the thighs 9 of each carcass half 19 and 21 ride as the cutting blades engage and separate the back portions 10 from the thighs 9 and legs 8. The guide plates guide the thighs and legs upwardly and over the cutting blades to prevent the thighs from contacting or engaging the cutting blades.

Figure 5:
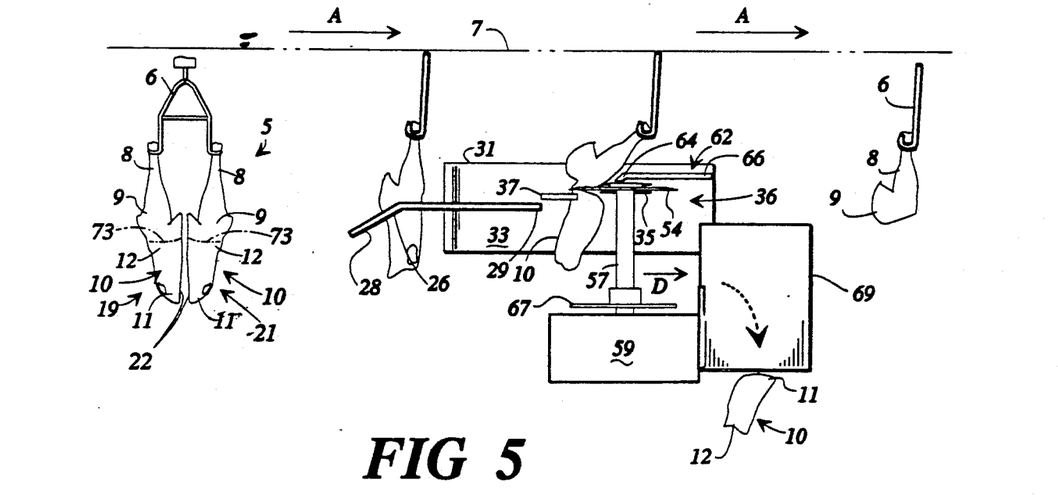
FIG. 5 is a schematic representation of the on-line poultry thigh remover and the process by which the back portions are separated from the legs and thighs of the carcass halves.

As FIGS. 1 and 3 illustrate, removal discs 67 and 68 are mounted to the drive shafts 57 and 58 positioned below and parallel to the cutting blades 54 and 56 of the rotary disc cutters 52 and 53. The removal discs 67 and 68 typically are formed from a nylon or plastic material and are rotated with the rotation of the cutting blades 54 and 56. As the back portions 10 are separated from the legs and thighs, they fall away from the cutting blades onto the removal discs. As indicated in FIGS. 4 and 5, the rotary movement of the removal discs and the contact of the back portions with the removal discs urges the back portions away from the removal discs, generally in the direction of arrow D (FIG. 4).

As shown in FIGS. 1, 2, and 4, a U-shaped guard plate 69 is mounted to the rear of the support frame 26. The guard plate 69 is open at its top and bottom and prevents the back portions 10 (FIG. 1) from being slung out of the on-line poultry thigh remover 14 as the back portions are urged away from the rotary disc cutters under centrifugal force by the rotation of the removal discs 67 and 68. A slide plate 71 (FIG. 2) is mounted below the open bottom portion of the guard plate 69 and extends downwardly at an incline from the open bottom portion of the guard plate to a removal conveyor 72. The back portions slide down the slide plate 71 onto the removal conveyor 72 which carries the backs away for further processing.

OPERATION

In operation of the on-line poultry thigh remover 14 (FIG. 1), the bird 5 initially is passed through a halving station 16, positioned upstream from the on-line poultry thigh remover. As the bird enters the halving station 15, it is carried into engagement with a pair of upwardly sloping converging guide rods 16 which stabilize and tilt the bird forwardly. As a result, the bird is reoriented so that its visceral cavity is aligned with and engaged by an internal guide rail 18, causing the bird to become mounted on the guide rail. The internal guide rail 18 guides the bird into engagement with a rotary halving blade 17 as the bird is pulled forwardly along its processing path by the overhead conveyor line. The rotary halving blade engages and cuts through the bird such that the bird is cut longitudinally through the backbone of the bird to separate the bird into substantially equally sized carcass halves 19 and 21 each having a substantially flat inwardly facing cut surface 22. The carcass halves remain suspended from the shackle 6 of the overhead conveyor line 7 and are carried by the overhead conveyor line toward the on-line poultry thigh remover 14.

Figures 6A, 6B, 7A, 7B, 8A, 8B:
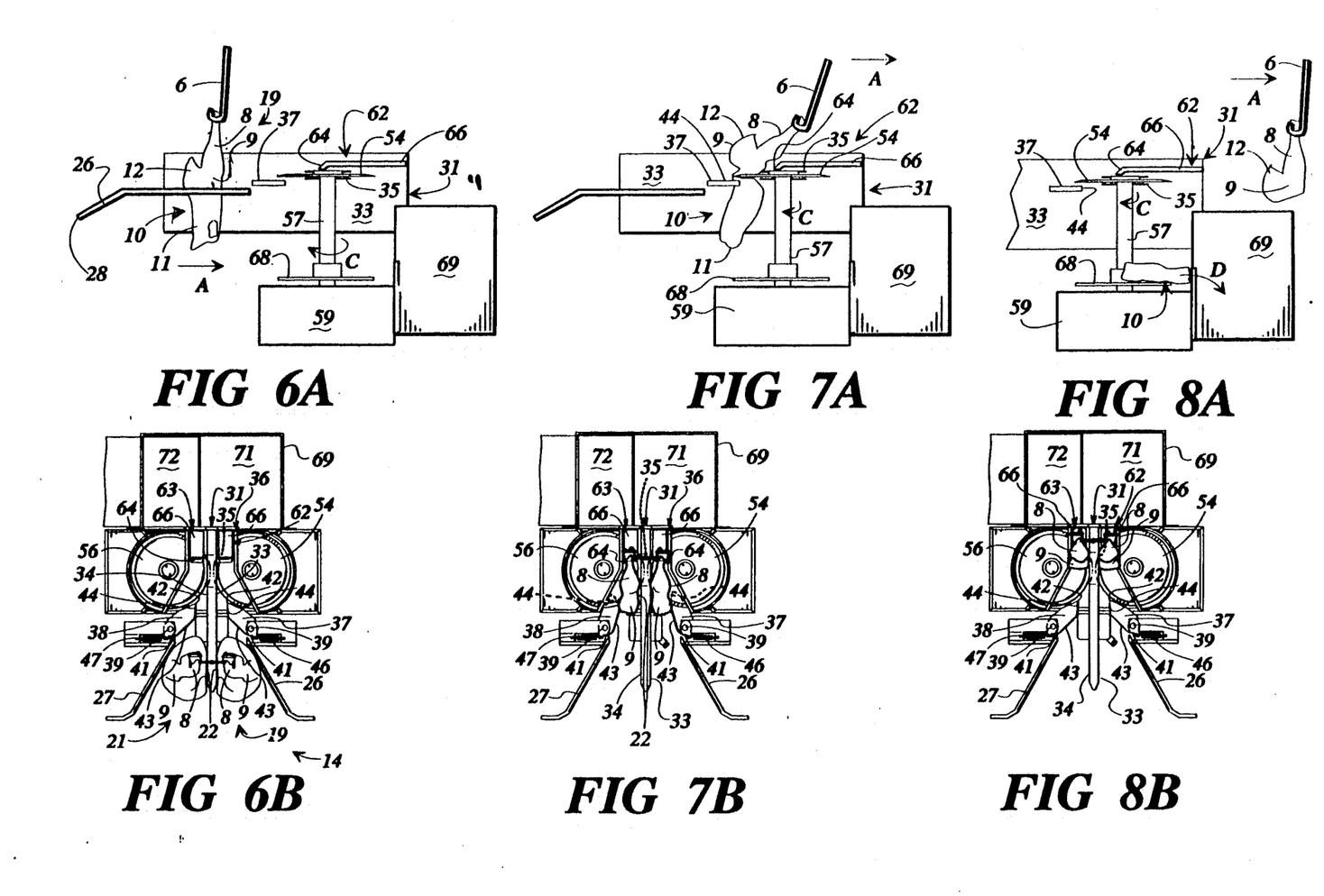
FIG. 6A is a schematic representation of a carcass half entering the on-line poultry thigh remover.
FIG. 6B is a plan view of the carcass halves entering the on-line poultry thigh remover.
FIG. 7A is a schematic representation of the location and engagement of the thigh joint of a carcass half by a yieldable cam shoe.
FIG. 7B is a plan view of the engagement of the thigh joints between the vertical center guide partition and the yieldable cam shoes.
FIG. 8A is a schematic representation of the separation of the thighs and back portions and the removal of the back portions of the carcass halves.
FIG. 8B is a plan view of the on-line poultry thigh remover showing the thighs of the carcass halves following the separation of the thighs from the back portions of the carcass halves.

As shown in FIGS. 5, 6A, and 6B, the carcass halves 19 and 21 are carried into engagement with the guide rods 26 and 27 as the carcass halves enter the on-line poultry thigh remover. The guide rods stabilize the carcass halves and prevent the carcass halves from swinging or twisting as they enter the on-line poultry thigh remover. The carcass halves are urged inwardly toward the center of the poultry apparatus, toward engagement with the vertical center guide partition, as they move along the length of the converging guide rods 26 and 27. The carcass halves 19 and 21 (FIG. 6B) contact and are separated by the vertical center guide partition 31, and, as shown in FIGS. 3, 4, 6A, and 6B, pass on opposite sides of the vertical center guide partition, dragged along the oppositely facing side surfaces 33 and 34 of the vertical center guide partition as the carcass halves are carried along their processing path in the directions of arrows A.

As the carcass halves 19 and 21 (FIG. B) proceed forwardly along their processing paths, the carcass halves are engaged by the first angular contact edges 43 of the spring biased yieldable cam shoes 37 and 38 (FIGS. 1, 7A, and 7B). The yieldable cam shoes 37 and 38 urge the inwardly facing cut surfaces 22 of the carcass halves 19 and 21 against the side surfaces 33 and 34 of the vertical center guide partition, into firm frictional engagement with the side surfaces of the vertical center guide partition. As the carcass halves are pulled forwardly by the overhead conveyor line, the movement of the thighs between the first angular contact edges 43 of the yieldable cam shoes and the side walls of the vertical center guide partition is resisted by the first angular contact edges 43. As a result, the thighs are pulled upwardly and over the first angular contact edges, causing the thighs to ride over the yieldable cam shoes as the carcass halves are carried forwardly by the overhead conveyor line.

As illustrated in FIGS. 4, 5, and 7A, the legs and thighs are raised vertically as the carcass halves are pulled forwardly and upwardly between the yieldable cam shoes and the side surfaces of the vertical center guide partition by the overhead conveyor line 7, until the thigh joints between the thighs 9 and the lower back portions 12 of the carcass halves are located and engaged between the first and second angular contact edges 43 and 44 of the yieldable cam shoes 37 and 38 and the side surfaces 33 and 34 of the vertical center guide partition 31. The second angular contact edges 44 of the yieldable cam shoes (FIG. 7B) press the thigh joints, which is an area of reduced mass or thickness between the thighs and back portions of the carcass halves with a relatively smaller amount of meat than the thighs or back portions and which are the weakest areas between the thighs and lower back portions, against the side walls of the vertical center guide partition. As the thigh joints are pressed against the side surfaces of the vertical center guide partition, the back portions are pulled against the lower surfaces of the yieldable cam shoes, which prevents the back portions of the carcass halves from being pulled between the first and second contact edges of the yieldable cam shoes and the side surfaces of the vertical center guide partition.

The engagement of the thigh joints by the second angular contact edges partially dislocates the thigh joints and restricts further vertical movement of the back portions of the carcass halves between the yieldable cam shoes and the vertical center guide partition. As shown in FIGS. 4, 5, and 7A, the location and engagement of the thigh joints between the thighs and the lower backs of the carcass halves by the first and second angular contact edges of the yieldable cam shoes aligns the thigh joints with the cutting blades 54 and 56 (FIG. 4) of the rotary disc cutters 52 and 53. Thus, the yieldable cam shoes function as an automatic height adjustment means to position the thighs and back portions of the carcass halves at the desired elevation for cutting without requiring any adjustments to the position of the on-line poultry thigh joint adjustment and separator to accommodate different sized birds. As a result, the cutting blades cut through the thigh joints between the thighs and back portions of the carcass halves, thereby minimizing the risk of the bones of the carcass halves being engaged by the cutting blades.

As illustrated in FIGS. 4 and 5, as the carcass halves are carried further forwardly, thighs 9 ride over the yieldable cam shoes and the thigh joints between the thighs and lower backs of the back portions of the carcass halves are pulled into engagement with the cutting blades 54 of the rotary disc cutters 52 and 53 (FIG. 4). As FIG. 5 illustrates, the cutting blades cut through the thigh joints along cutting lines 73 as the carcass halves are moved by the overhead conveyor line 7 in the direction of arrows A, to separate the back portions 10 of the carcass halves from the legs 8 and thighs 9 of the carcass halves 19 and 21. As FIGS. 4, 5, 8A, and 8B illustrate, as the cutting blades cut through the thigh joints, the thighs of the carcass halves engage and ride over the guide surfaces 64 and 66 of the guide plates 62 and 63 (FIG. 4), which prevent the thighs from contacting the cutting blades and accidentally being engaged and possibly damaged by the cutting blades as the back portions 10 are separated from the legs and thighs.

As indicated in FIG. 5, as the back portions 10 are separated from the legs and thighs of the carcass halves, the back portions fall downwardly onto the removal discs 67 and 68, as shown in FIGS. 3 and 4. The removal discs are rotated with the revolution of the cutting blades of the rotary disc cutters 52 and 53 by their drive motors 59 and 61 in the direction of arrow C (FIGS. 4 and 8A). The rotation of the removal discs 67 and 68 (FIG. 3) causes the back portions 10 of the carcass halves which fall onto the removal discs to be propelled from beneath the cutting blades in the direction of arrow D (FIGS. 4 and 8A), as a result of the action of centrifugal force created by the rotation of the removal discs.

As shown in FIG. 4, the back portions 10 are prevented from being thrown out of the on-line poultry thigh remover by a guard plate 69 adjacent the removal discs which blocks the travel of the back portions and causes the back portions to fall downwardly onto the inclined surface of a slide plate 71. The back portions slide down the angled surface of the slide plate 71 and onto a removal conveyor 72 (FIG. 1) which carries the back portions away from the poultry processing line together with other cut-up portions of the bird for further processing and packaging in the poultry processing plant.

The on-line poultry thigh remover can accommodate birds of various sizes and can accommodate any number of birds that might be carried by conventional processing lines. Consequently, it is recognized that an improved method and apparatus is now provided for the on-line separation of the upper and lower back portions from the legs and thighs of birds as the birds are carried by an overhead conveyor line without the necessity of removing the birds from the overhead conveyor line and manually transporting the birds to separate processing equipment, thereby providing for a significant increase in the processing rate of birds and other poultry.

While the invention has been illustrated and described in association with poultry carcasses, it will be understood that the principles of the invention can be applied to animals as well as poultry.

It will be understood by those skilled in the art that the foregoing relates only to a presently preferred embodiment of the present invention, and numerous variations or modifications may be made thereto without departing from the spirit and scope of the invention as set forth in the following claims.

What is claimed is:

1. A process of dissecting chickens and other poultry, comprising the steps of:
    moving birds suspended by their legs in spaced series along a processing path with a conveyor system, as the birds are moved along the processing path;
    cutting the birds longitudinally in halves, with each carcass half being suspended by a leg,
    moving the carcass halves of the birds on opposite sides of a guide member extending parallel to the movements of the birds with the longitudinally cut surfaces of the carcasses facing the guide member;
    urging the carcass halves of the birds toward engagement with the guide member with the longitudinally cut surfaces of the carcass halves engaging the guide member;
    guiding the carcass halves with the guide member toward cutting means, and
    cutting through the carcass halves as the carcass halves are urged toward engagement with the guide member.

2. The process of claim 1 and wherein the step of cutting through the carcass halves comprises cutting with disc cutters through the carcass halves, with the peripheries of the disc cutters intersecting the guide member.

3. The process of claim 1 and wherein the step of moving the carcass halves on opposite sides of the guide member comprises moving the carcass halves on opposite sides of a vertical center guide partition having opposite sides parallel to each other and parallel to the processing path, and wherein the step of urging the carcass halves toward engagement with the guide member comprises urging the longitudinally cut surfaces of the carcass halves into flat abutment with the opposite sides of the vertical center guide partition.

4. The process of claim 1 and wherein the step of cutting through the carcass halves comprises cutting with disc cutters with a motion that intersects the opposite surfaces of the guide member.

5. The process of claim 1 and wherein the step of guiding the carcass halves toward a cutting means comprises lifting the thigh until the thigh joint is at the level of the cutter and guiding the thigh joint to the cutter, moving the carcass toward the cutter with the joint between the back and the thigh positioned below the cutter, and engaging the thigh joint with a yieldable cam shoe.

6. A method of separating the legs and thighs of birds from the backs of birds, comprising:
    moving a plurality of birds in series along an overhead conveyor line with each bird suspended by its legs from the overhead conveyor line;
    as each of the birds moves along its processing path, locating and engaging the thigh joints between the thighs and backs of the birds;
    aligning the thigh joints of the birds with a cutting means to position the backs of the birds at the proper elevation for separation from the legs and thighs of the birds; and
    cutting through the thigh joints with the cutting means to separate the backs from the legs and thighs of the birds.

7. The method of claim 6 and further including the step of trailing the thighs along a guide surface so as to support the birds during cutting.

8. The method of claim 6 and wherein the step of locating and engaging the thigh joints comprises moving the thighs of the birds between yieldable cam shoes and a vertical center guide partition and engaging the thighs of the birds between the yieldable cam shoes and the vertical center guide partition such that as the birds move along their processing path, the yieldable cam shoes locate and engage the thigh joints.

9. The method of claim 8 and wherein the step of cutting through the thigh joints comprises cutting with a disc cutter with a motion that intersects opposite surfaces of the vertical center guide partition.

10. A method of subdividing previously eviscerated birds, each of which has been suspended by its legs on a shackle and is moving along a processing path and each of which has been separated along its back bone into equal carcass halves, with each half including a leg, a thigh, and a back portion, comprising:
    moving the carcass halves on opposite sides of a vertical center guide partition toward a cutting means with the cut surface of each half carcass facing the partition;

tilting the carcass halves until the thigh joints between the thighs and back reach a predetermined elevation for cutting;

engaging the thigh joints of the carcass halves with yieldable cam shoes and urging the thigh joints with the yieldable cam shoes toward the partition so that the thigh joints are pulled between the cam shoes and the partition;

when the thigh joints reach the cam shoes, passing the thigh joints between the partition and the cam shoes with the cam shoes yielding to the thigh joints to permit the passing of the thigh joints, and separating the back portion from the legs and thighs of the birds at the thigh joints with the cutting means.

11. The method of claim 10 and further including the step of dropping the back portions of the birds after the back portions are separated from the thighs of the birds onto a removal disc, and rotating the removal discs at a velocity sufficient to urge the back portions away from the cutting means for removal.

12. The method of claim 10 and wherein the step of tilting the carcass halves includes the step of trailing the thighs along a guide surface so as to support the carcass halves during cutting, whereby the backs of the birds are positioned at the proper elevation for separation from the legs and thighs of the birds.

13. Apparatus for separating the legs and thighs of previously eviscerated birds while the birds are moved in series suspended by their legs from an overhead conveyor line, comprising:

a vertically oriented guide member for separating halves of each bird;

a pair of yieldable cam shoes positioned on opposite sides of said guide member and aligned with the path of travel of the birds for locating and engaging each bird at a joint between the thigh and back of each bird;

a pair of substantially horizontally oriented rotary disc cutters positioned on opposite sides of said guide member downstream from said yieldable cam shoes in a position to engage and cut through the joints between the thighs and backs of the birds to separate the thighs from the backs of the birds; and means for removing the backs after the backs have been separated from the thighs, mounted adjacent said rotary disc cutters in a position to receive the backs from said rotary disc cutters.

14. The apparatus of claim 13 and further including a pair of parallel guide rods mounted on opposite sides of said vertically oriented guide member and extending outwardly from said guide member for contacting the birds and urging the birds toward said guide member.

15. The apparatus of claim 13 and wherein said means for removing the backs of the birds comprises a pair of removal discs each mounted below one of said rotary disc cutters and rotated with the rotation of said rotary disc cutters such that as the backs are separated from the thighs of the birds and fall onto said removal discs, the rotation of said surface discs urges the backs away from said rotary disc cutters toward a removal means.

16. Apparatus for subdividing and separating the backs and thighs of birds as the birds are moved along an overhead conveyor line suspended by their legs in an inverted attitude, comprising:

a halving station for placement along the path of movement of the birds on the overhead conveyor line for cutting the birds into carcass halves; and a processing station for placement downstream from said halving station along the path of movement of the birds for separating the legs and thighs from the backs of the birds;

said processing station including means for locating and aligning the thigh joints between the thighs and backs of the birds at a desired elevation for cutting and a cutting means positioned downstream from said means for locating and aligning the thigh joints for engaging and cutting through the thigh joints to separate the thighs from the backs of the birds.

17. The apparatus of claim 16 and wherein said halving station comprises a longitudinal internal guide rail aligned with the path of movement of the birds for supporting the visceral cavity of each bird during cutting, and a rotary halving blade mounted along the length of said internal guide rail, extending through said internal guide rail for engaging and cutting longitudinally through the birds to separate the birds into carcass halves.

18. The apparatus of claim 16 and wherein said means for locating and aligning the thigh joints at the desired elevation for cutting comprises a vertical center guide partition mounted in said processing station along a central axis of said processing station and yieldable cam shoes mounted adjacent said vertical guide partition in position to be engaged by the thighs of the birds as the birds are moved along the overhead conveyor line, whereby the thighs are engaged and pulled between said vertical center guide partition and said yieldable cam shoes as the birds are moved along the overhead conveyor line, with the thighs being raised to thereby raise the thigh joints to the desired elevation for cutting.

19. The apparatus of claim 16 and wherein said cutting means comprises a pair of removal discs each mounted below one of said rotary disc cutters and rotated with the rotation of said rotary disc cutters such that as the backs are separated from the thighs of the birds and fall onto said removal discs, the rotation of said surface discs urges the backs away from said rotary disc cutters toward a removal means.

20. The apparatus of claim 18 and further including a pair of parallel guide rods mounted on opposite sides of said vertically oriented guide member and extending outwardly from said guide member for contacting the birds and urging the birds toward said guide member.

21. A method of separating the thigh joints between the backs and thighs of poultry carcasses, comprising:

advancing poultry carcasses in series suspended invertedly by their legs in shackles of an overhead conveyor system along a processing path;

as the carcasses are advanced along the processing path;

cutting each bird longitudinally along its spine into equal halves, with each half suspended by its leg from a shackle;

moving each bird half along opposite sides of a vertical partition;

moving the thigh of each bird half into engagement with a yieldable cam shoe positioned adjacent the vertical partition;

as the thigh of each bird half engages its cam shoe, pulling the bird halves with the shackle until the cam shoes engage the smaller areas of the thigh joints between the thighs and the back portion of each carcass half;

as the shackle continues to pull the bird halves, yieldably opening the cam shoes away from the partition to allow the thigh joints to move between the cam shoes and the partition; and as the thigh joints emerge from the cam shoes, cutting through the thigh joints of the bird halves to drop the back portion of the carcass from the thighs of the carcass.

22. A method of separating the legs and thighs from the back portions of poultry carcasses, comprising:

moving the poultry carcasses in series along a processing path toward a cutting means with each poultry carcass suspended by its legs from an overhead conveyor line;

engaging the thighs of the poultry carcasses with yieldable cam shoes as the poultry carcasses move along their processing path and resisting the movement of the thighs with the cam shoes;

urging the thighs upwardly and over the cam shoes as the poultry carcasses continue to move along their processing path;

locating and engaging areas of reduced thickness between the thighs and back portions, with the cam shoes yielding to permit the passing of the areas of reduced thickness; and cutting through the areas of reduced thickness with the cutting means to separate the legs and thighs from the back portions of the poultry carcasses.

23. The method of claim 22 and further including the step of cutting the poultry carcasses longitudinally along their backbones to separate the poultry carcasses into substantially equal carcass halves.

24. The method of claim 22 and wherein the step of urging the thighs over the yieldable cam shoes comprises tilting the poultry thighs and pulling the thighs forwardly with the movement of the poultry carcasses along the overhead conveyor line so that the thighs ride over the cam shoes to raise the thighs to a desired elevation for cutting at the areas of reduced thickness between the thighs and back portions of the poultry carcasses.

25. The method of claim 22 and further including the step of trailing the thighs along a guide surface so as to support the birds during cutting.

* * * * *